Aug. 28, 1945. E. S. MacPHERSON 2,383,873
VEHICLE DRIVE MECHANISM
Filed Jan. 25, 1943 4 Sheets-Sheet 2

Inventor
Earle S. MacPherson
By Blackmore, Sauce & Flint
Attorneys

Aug. 28, 1945.   E. S. MacPHERSON   2,383,873
VEHICLE DRIVE MECHANISM
Filed Jan. 25, 1943   4 Sheets-Sheet 3
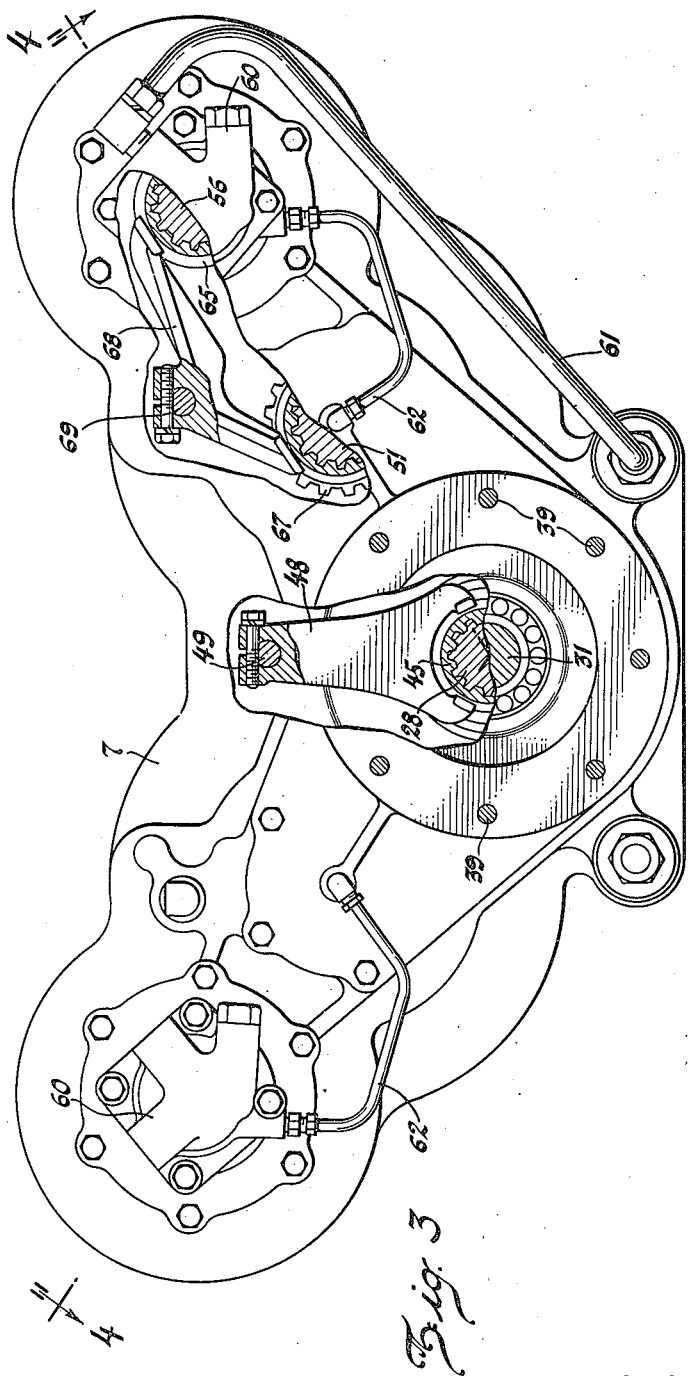
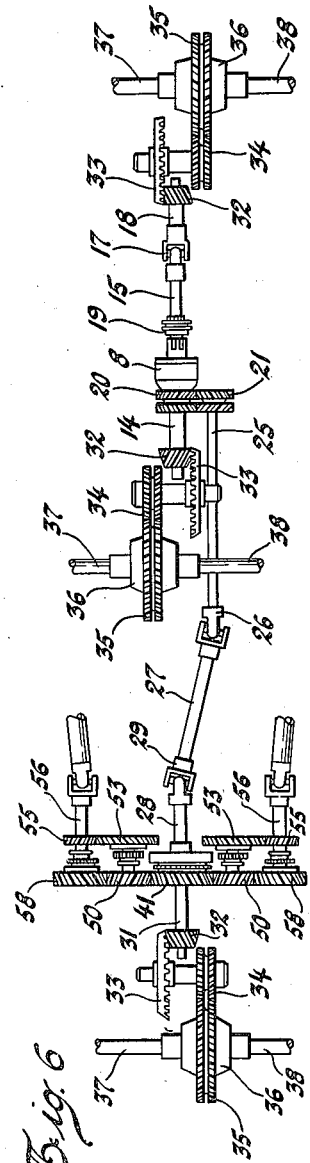
Inventor
Earle S. MacPherson
By Blackmore, Spencer & Hurd
Attorneys Patented Aug. 28, 1945

2,383,873

UNITED STATES PATENT OFFICE 2,383,873

VEHICLE DRIVE MECHANISM

Earle S. MacPherson, Detroit, Mich., assignor to General Motors Corporation, Detroit, Mich., a corporation of Delaware Application January 25, 1943, Serial No. 473,511

8 Claims. (Cl. 180—24)

This invention relates to heavy duty motor vehicles having multiple drive axles and especially to an arrangement for dividing the driving torque between the several axles in selected speed ratios from either or both of two engines.

It is an object of the invention to provide an improved two speed transfer case by which two engines may be coupled together and transmit power from a torque divider to the traction wheels.

A further object is to provide for differential action between all of the several wheels with division of torque for transmitting approximately one-third of the power through a driving connection with one axle and approximately two-thirds of the power through a driving connection with a pair of tandem wheels and with provision for locking out the differential action between the axle units.

Figure 1:
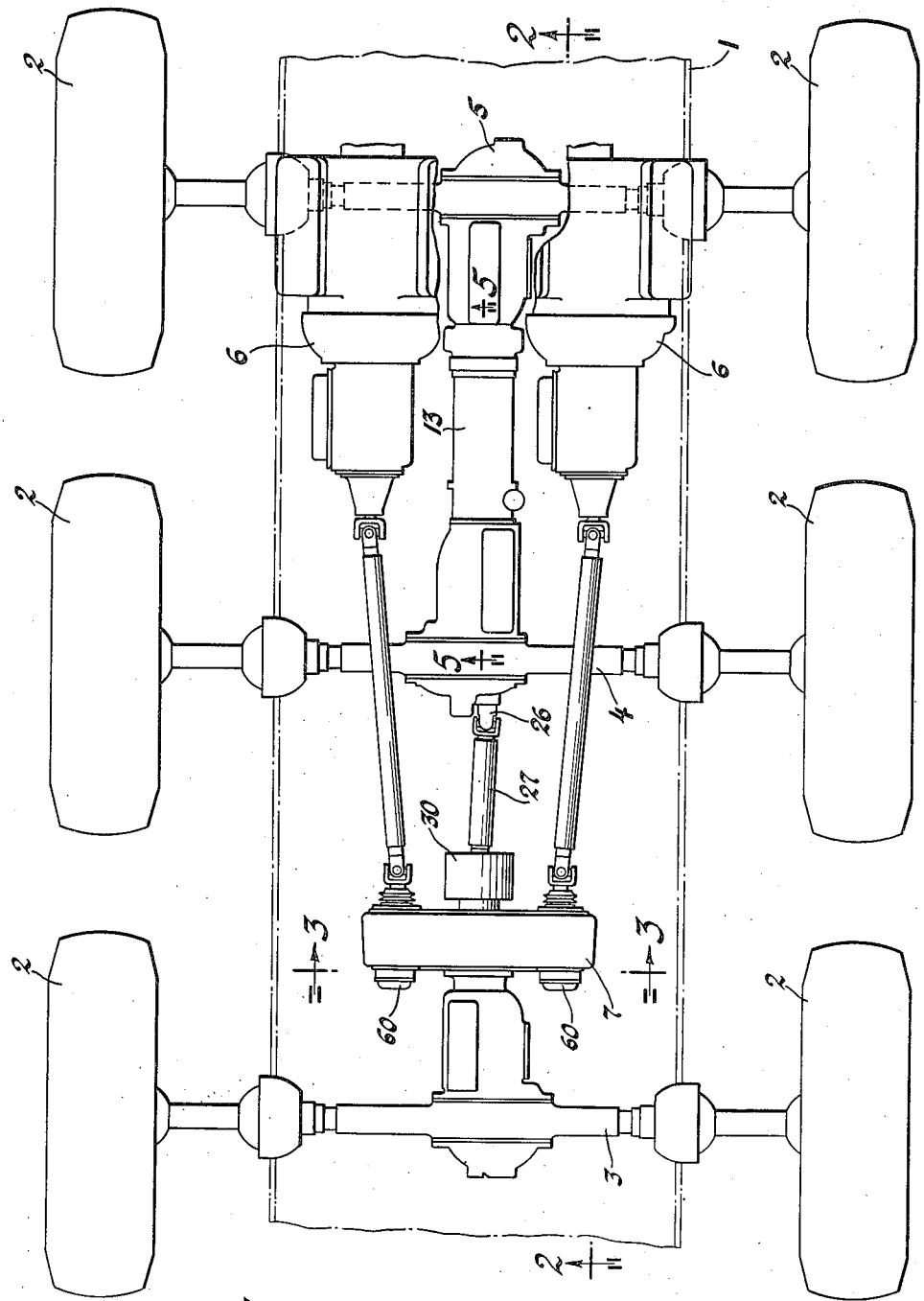
Figure 2:
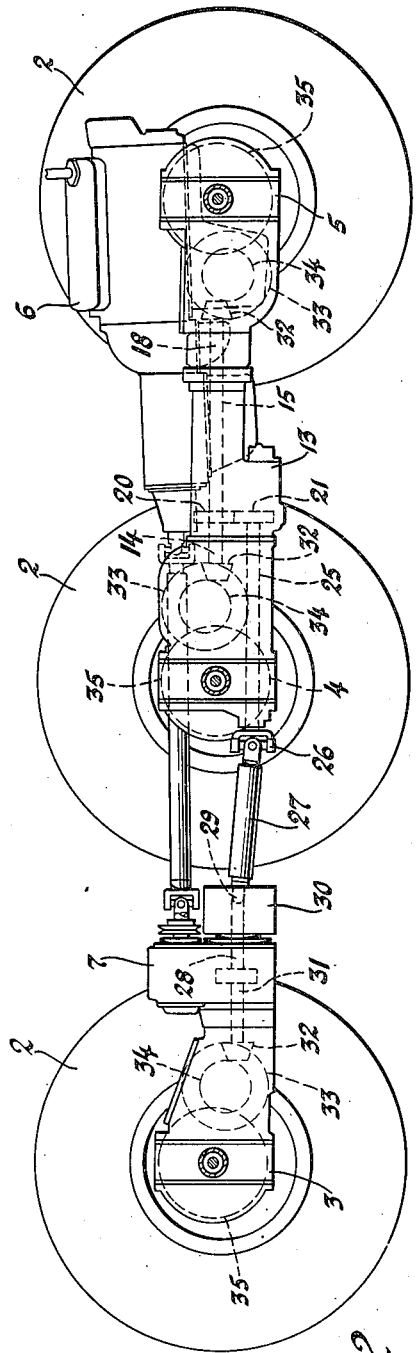
Figure 5:
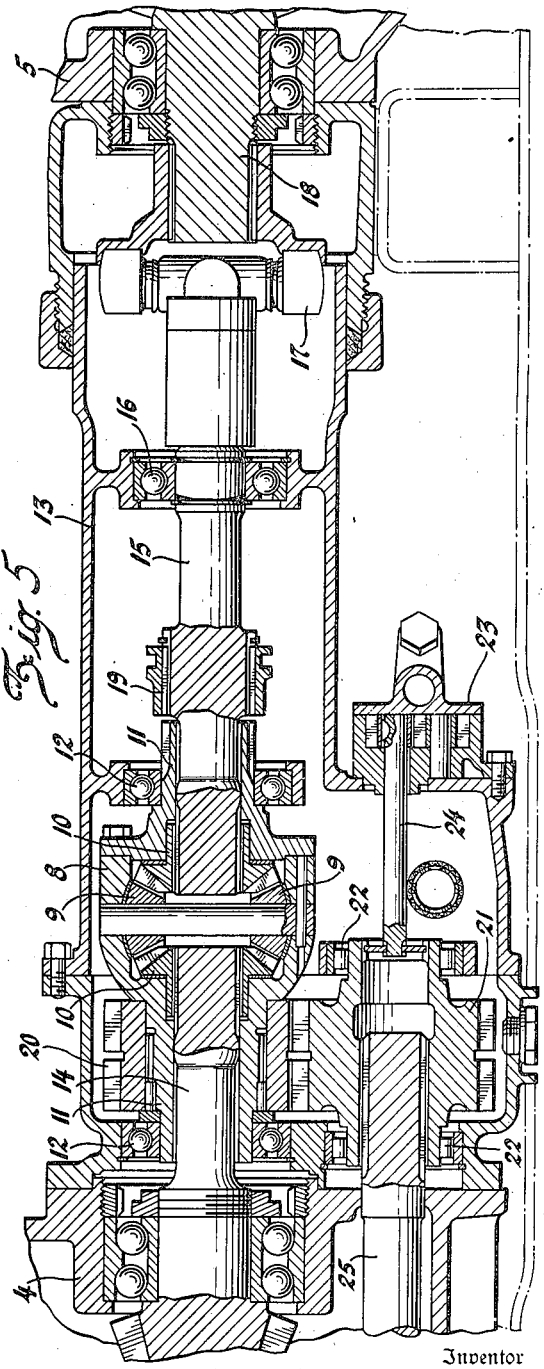
Figure 4:
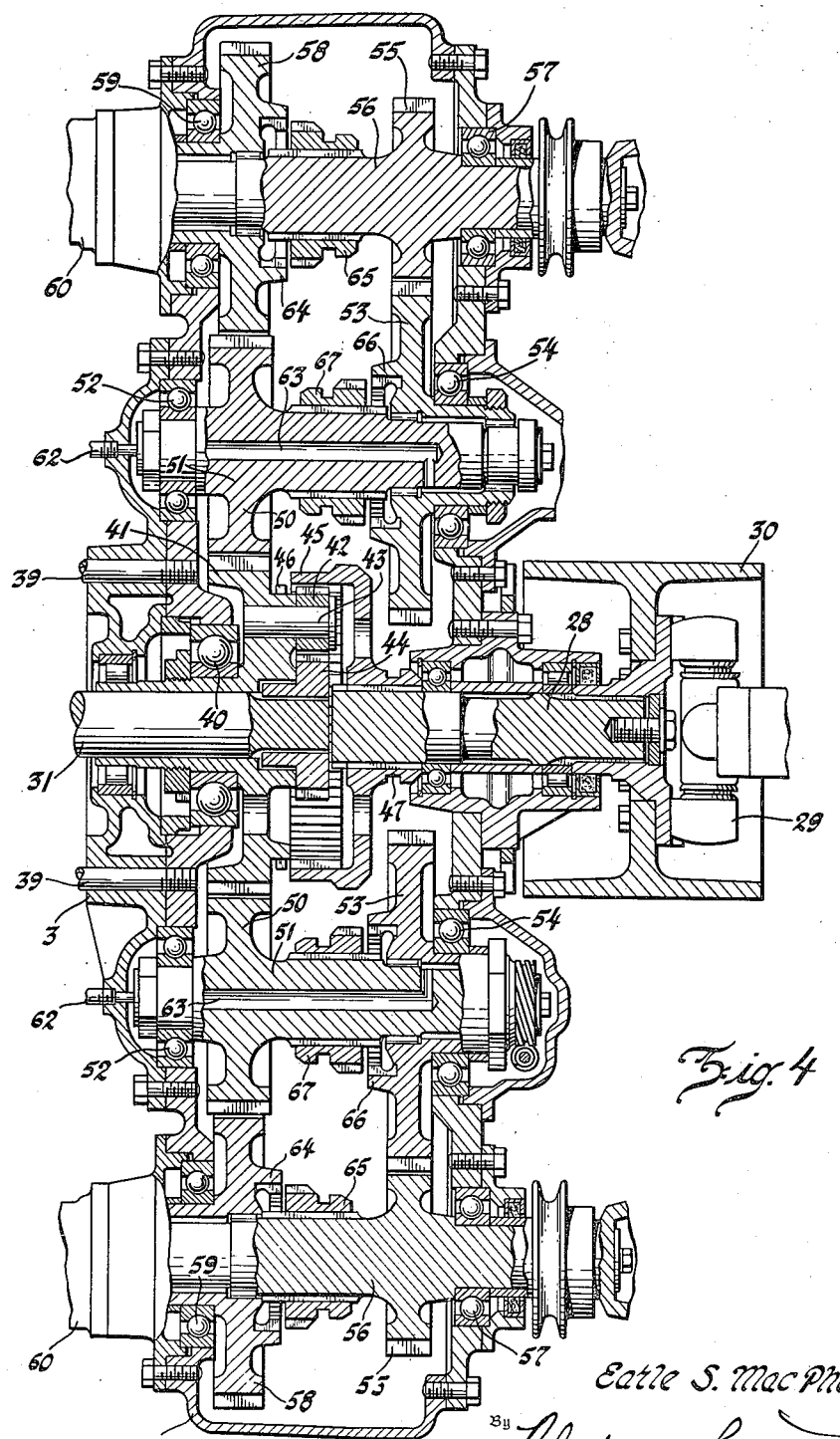

Additional objects will become apparent during the course of the following specification having reference to the accompanying drawings wherein Figure 1 is a top plan view of a portion of a motor vehicle and illustrates the general arrangement of the drive units; Figure 2 is a longitudinal section taken on line 2—2 of Figure 1 and shows the major parts in side elevation; Figure 3 is an end elevation as viewed on line 3—3 of Figure 1 but on a larger scale and with parts broken away; Figure 4 is a sectional view of the transfer case as on line 4—4 of Figure 3; Figure 5 is a longitudinal section showing the drive gearing contained with a housing between the tandem rear axles and as taken on line 5—5 of Figure 1 and Figure 6 is a plan view diagram of the driving gear.

In the drawings there is illustrated the preferred but not necessarily the only embodiment of the invention as applied to an armored car having a body or hull 1 supported upon six independently sprung wheels 2—2 arranged in pairs at opposite ends of three driving axles 3, 4 and 5. Each axle assembly has a central portion supported rigidly in the hull and end portions universally jointed thereto for connection with the vertically deflectable wheels 2. When the middle axle 4 is positioned half-way between the front and rear axles 3 and 5, as shown in the drawings, the front wheels and the intermediate wheels are dirigible for steering purposes. Enclosed within the rear of the hull 1 in side by side relation are a pair of longitudinally disposed power plants or engine units 6—6 of conventional automotive type, each including variable speed gearing from which extends forwardly a universally jointed propeller shaft leading to the transfer case 7 mounted in the hull immediately behind the front axle 3.

The transfer case mechanism serves to couple the two engines for operation in unison to drive all of the several road wheels 2—2. It includes shiftable gearing for transmitting power from either or both engines in either of two speed ratios supplementary to the variable speed mechanisms associated with each power plant. It includes also a power dividing differential for delivering approximately one-third of the torque to an output shaft leading to the front axle and the remaining two-thirds of the torque to an output shaft leading to a differential drive connection between the two trailing axles so that there is substantially equal division of power between the axles, each of which also includes differential mechanism between its associated driving wheels whereby all the road wheels are driven in differential relation to one another. Mechanism is provided to lock out the differential action between the several axles for solid drive under difficult operating conditions, such as slow travel on soft ground.

The differential in the space between the tandem drive axles 4 and 5 includes a cage 8 (see Figure 5) mounting therein the beveled gears 9—9 and the side gears 10—10 and having oppositely extending tubular sleeves 11—11 mounted in spaced bearings 12—12 which are carried by the enclosing casing 13 bolted to the housings of the drive axles 4 and 5. The shaft 14 for the drive pinion of the axle assembly 4 is splined at its end within one of the side gears 10 while the other side gear is splined on the end of an intermediate shaft 15 supported by the bearing 16 and connected by a universal joint 17 with the shaft 18 of the drive pinion for the axle assembly 5. For locking out differential action a clutch collar or slider 19 having internal teeth fitted to companion teeth on an enlargement of the intermediate shaft 15 is moved toward the left in Figure 5 into engagement with tooth formations on the adjacent cage extension 11 for solid drive. Operation of the clutch 19 is under control of suitable shifter mechanism, not shown, but which includes an operating handle adjacent the driver's seat or control station. The opposite cage extension 11 has keyed thereon a gear 20 in mesh with a gear 21 having opposite tubular extensions mounted in bearings 22 carried by the case 13. A lubricant gear pump 23 removably mounted on a wall of the case has a drive shaft 24 detachably slidably splined within one end of the gear 21. Detachably slidably splined in the opposite end of the gear 21 is the terminal of a drive shaft 25 which projects forwardly beyond the housing of the axle assembly 4 and is connected by a universal joint 26 with a propeller shaft 27. At its forward end the propeller shaft 27 is joined to an output shaft 28 of the transfer case by means of a universal joint 29 to an annular flange of which is bolted a brake drum 30 adapted to be engaged by a contractible band, not shown. In axial alignment with the output shaft 28 is another output shaft 31 extending forwardly and carrying the drive pinion for the front axle assembly 3.

The several axle assemblies are substantially alike in that each involves double reduction gearing. In each case the drive pinion 32 and mating ring gear 33 have hypoid teeth and the intermediate shaft for the ring gear carries a herringbone drive gear 34 meshing with a herringbone driven gear 35 on the differential cage 36 between driving axle sections 37 and 38. Upon reference to Figures 2 and 6 it will be noted that in the front axle 3 the ring gear 33 is on the right of the pinion 32 with the plane of the pinion axis below the axis of the ring gear. In the case of the intermediate axle 4 where the direction of rotation of the drive shaft 14 is opposite to that of the drive shaft 31 because of the gears 20 and 21 the ring gear 33 is on the left of the pinion 32 with the pinion axis below the ring gear axis while in the rear axle 5 the ring gear 33 is on the right of the pinion 32 and the pinion axis is above the ring gear axis. By this arrangement power is transmitted for forward drive through the forward drive faces of the hypoid gearing in each instance.

As shown in Figure 4 the gear case of the front axle 3 is secured by bolts 39 to the transfer case 7. The combined cases support axially spaced bearings 40 for the sleeve extension of a driven gear or differential carrier 41 forming part of the torque divided between the two output shafts 28 and 31. A series of planetary gears, such as indicated at 42, are mounted on the carrier 41 by studs or plus 43 and mesh with the external teeth of a sun gear 44 splined on the output shaft 31 and with the internal teeth of a ring gear 45 whose hub is splined on the output shaft 28 whereby the output shafts are both driven from the carrier 41 with a differential action and a division of torque due to the difference in diameters of the gears 44 and 45, the relation being such that one-third of the power goes to the output shaft 31 driving the single front axle 3 and two-thirds of the power goes to the output shaft 28 driving the two axles 4 and 5. To lock out the differential action the carrier 41 is provided with circumferentially spaced tooth formations 46 adapted to be engaged by the internal teeth of the ring gear 45 when the ring gear is shifted toward the left in Figure 4. Axial shifting of the ring gear setting is accommodated by the sliding splined connection between its hub and output shaft 28, the hub having an annular groove 47 engaged by the fork 48 (see Figure 3) fastened on the shift rail 49 which is joined to suitable operating linkage controlled from the vehicle operator's station.

In constant mesh with the carrier gear 41 of the power divider are a pair of driven gears 50—50 fixed or formed integral with countershafts 51—51. One end of each shaft is rotatably supported in the casing wall by a bearing 52 and the opposite end is rotatably supported in a gear 53 in turn supported in the casing wall by a bearing 54. The gears 53—53 are in constant mesh with the driving gears 55—55 fixed for formed integral with a pair of input shafts 56—56 contained within the transfer casing and connected to the propeller shafts driven from the respective power plants 6—6. Each input shaft has one end rotatably supported by the bearing 57 and its opposite end rotatably mounted in the gear 58 supported in a bearing 59 in constant mesh with the countershaft gear 50.

Beyond the gears 58 the input shafts are operably connected with lubricant gear pumps contained within housings 60, each having an intake pipe 61 leading from a sump or well from the bottom of the transfer case 7 and one or more delivery pipes, such as 62, leading to parts needing lubrication. As seen in Figure 4 the lubricant delivery duct 62 discharges into an axially aligned bore 63 in the countershaft 51 from which extend one or more lateral ports for feeding lubricant to the bearings.

Each of the gears 58 is formed laterally with an annular projection 64 having internal clutch teeth to be engaged by a toothed sliding collar 65 splined on the input shaft 56 for coupling the gear to the shaft. When so coupled the drive from the input shaft will be through the gear 58 to the countershaft gear 50 to the power divider. Similarly each gear 53 is formed with an internally toothed projection 66 to be coupled by a sliding clutch collar 67 splined on the countershaft for transmitting the drive from the input shaft gear 55 through the countershaft gear 50 to the power divider. Thus with proper diameters of the intermeshing gears one speed ratio is afforded by the cooperating gears 55 and 53 and another speed ratio is had through the gears 58 and 50 with proper selection of speed settings being under control of the sliding clutches 65 and 67. Both clutch collars have annular grooves to be engaged by the arms of a shifter fork 68 fastened to a shift rail 69 arranged to be operated from the driver's station. Separate shift rails are provided for the two engine driven gear trains and these may be manipulated either individually, if only one engine is to furnish motive power, or conjointly if both engines are to be coupled together. In Figure 4 the several clutches are shown in their neutral or clutch disengaged settings. Movement toward the left couples the input shaft 56 with the gear 58 for a high speed setting while movement to the right couples the gear 53 with the countershaft 51 for low speed setting.

I claim:

1. In combination, a drive axle assembly having a differential between the wheels thereof, a pair of tandem drive axle assemblies having a differential therebetween and each having a differential between the wheels thereof, a power source for driving all the wheels, a power divider connecting said power source and the axles for transmitting less than half the torque to the first mentioned axle and the remainder to said tandem axles, said power divider comprising differential gearing including a sun gear drive connected with the differential of the first mentioned axle, a ring gear drive connected with the differential between the tandem axles, a planet gear in mesh with both the sun gear and the ring gear, a carrier for the planet gear drive connected with the power source, means slidably mounting said ring gear for axial adjustment toward and from the carrier and clutch formations on the carrier adapted to be engaged by the slidable ring gear for releasably coupling the same to the carrier at will.

2. In combination, a drive axle assembly having a differential between the wheels thereof, a pair of tandem drive axle assemblies having a differential therebetween and each having a differential between the wheels thereof, a power source for driving all the wheels, a power divider connecting said power source and the axles for transmitting less than half the torque to the first mentioned axle and the remainder to said tandem axles, said power divider comprising differential gearing including a sun gear drive connected with the differential of the first mentioned axle, a ring gear drive connected with the differential between the tandem axles, a planet gear in mesh with both the sun gear and the ring gear, a carrier for the planet gear drive connected with the power source, and means to lock out the differential between said tandem axles.

3. In a power divider, an enclosing housing, a pair of output shafts journaled in said housing, a power divider therebetween having a driven gear, a pair of countershafts journaled in said housing on opposite sides of and above the horizontal plane of the output shafts and each countershaft having a fixed gear and a rotatably mounted gear thereon, with the fixed gears in mesh with the driven gear of said power divider, a pair of input shafts journaled in said housing on axes spaced outwardly of and above the axes of the countershafts and each having a fixed gear and a rotatably mounted gear in mesh respectively with a rotatable gear and a fixed gear on the adjacent countershaft, shiftable jaw clutches slidably splined on each countershaft and on each input shaft for cooperative releasable drive engagement with the rotatable gears on the several shafts and operating means for said clutches for selectively coupling either or both of the input shafts with said power divider in either of two speed settings.

4. In a transfer case, a power divider coupling a pair of output shafts and having a drive gear, a pair of gears in constant mesh with said drive gear, a pair of countershafts fixed respectively to the gears of said pair and each having an axially slidable clutch collar splined thereon, driven gears arranged to be coupled by the clutch collars to said countershafts, a pair of input shafts having gears fixed thereon in mesh with said driven gears and axially slidable clutch collars splined thereon, a pair of drive gears in mesh with the first mentioned pair of gears and arranged to be coupled by the last mentioned clutch collars to said input shafts, a housing enclosing all of said gears and bearings carried by the housing for rotatably supporting the several shafts therein.

5. In a transfer case, a train of five intermeshing gears, a power divider between a pair of output shafts drive connected with the centrally disposed gear, a pair of input shafts having clutches for selectively coupling the same to the endmost gears respectively, countershafts fixed to the remaining gears, a set of two intermeshing gears, one of which is fixed on one of the input shafts, clutch means to couple selectively the other gear of said set with one of the countershafts, a second set of two intermeshing gears, one of which is fixed to the other input shaft and clutch means to couple selectively the other gear of the second set with the other of said countershafts.

6. In a transfer case, a housing, a pair of input shafts and a pair of countershafts all journaled in said housing, each shaft having thereon within said housing a fixed gear, a rotatable gear of different diameter than the fixed gear and a slidable clutch to couple the rotatable gear to the shaft and said shafts being arranged so that each fixed gear meshes with a rotatable gear on a companion shaft and a power divider connecting a pair of output shafts and having a driven gear meshing with said fixed gears of both countershafts.

7. In a motor vehicle, a transfer case having a pair of input shafts and a pair of output shafts, a ring gear having a shiftable drive splined connection with one of the output shafts, a sun gear drive connected with the other output shaft, a planet gear in mesh with both the sun gear and the ring gear, a planet carrier drive connected with both input shafts, clutching teeth on the planet carrier for selective locking engagement with said ring gear and control means for effecting shifting travel of the ring gear.

8. In a transfer case, a central gear, a pair of countershafts in spaced parallelism on opposite sides of the central gear, each having a fixed gear in mesh with said central gear and a rotatably mounted gear, a pair of input shafts, each having a fixed gear in mesh with the gear rotatably mounted on its adjacent countershaft and a rotatably mounted gear in mesh with the fixed gear of its adjacent countershaft, selectively operable clutches between each rotatable gear and its shaft, two independent and separately operable clutch control mechanisms, one serving in common the clutches on one input shaft and its adjacent countershaft and the other serving in common the clutches on the other input shaft and its adjacent countershaft, said clutch control mechanisms being arranged to couple the clutches selectively for transmitting drive to the central gear in either of two speed settings and either individually or conjointly from said pair of input shafts.

EARLE S. MACPHERSON.